US006849855B1

United States Patent
Shih et al.

(10) Patent No.: US 6,849,855 B1
(45) Date of Patent: Feb. 1, 2005

(54) METHOD FOR MARKING AND IDENTIFYING OBJECTS COATED WITH UP-CONVERSION MATERIAL

(75) Inventors: I-Fu Shih, Los Alamitos, CA (US); David B. Chang, Tustin, CA (US)

(73) Assignee: Raytheon Company, Waltham, MA (US)

( * ) Notice: Subject to any disclaimer, the term of this patent is extended or adjusted under 35 U.S.C. 154(b) by 1826 days.

(21) Appl. No.: 08/017,953

(22) Filed: Feb. 12, 1993

Related U.S. Application Data

(63) Continuation of application No. 07/773,473, filed on Oct. 9, 1991, now abandoned.

(51) Int. Cl.[7] .................................................. G01J 1/58
(52) U.S. Cl. .................................. 250/459.1; 250/458.1
(58) Field of Search ........................... 250/458.1, 459.1, 250/483.1, 489.1, 302

(56) References Cited

U.S. PATENT DOCUMENTS

| | | | | |
|---|---|---|---|---|
| 3,593,055 A | * | 7/1971 | Geusic et al. ............. 250/458.1 |
| 3,599,109 A | * | 8/1971 | Guggenheim ............. 250/458.1 |
| 3,634,614 A | * | 1/1972 | Geusic et al. ............. 250/458.1 |
| 3,675,039 A | * | 7/1972 | Boyd et al. ................. 250/330 |
| 4,598,205 A | * | 7/1986 | Kaule et al. ............. 250/458.1 |
| 4,760,257 A | * | 7/1988 | Pollack et al. ............. 250/330 |
| 5,003,179 A | * | 3/1991 | Pollack ..................... 250/483.1 |
| 5,099,131 A | * | 3/1992 | Brownrigg et al. ...... 250/458.1 |
| 5,134,296 A | * | 7/1992 | Gravisse et al. ......... 250/459.1 |

* cited by examiner

Primary Examiner—Carolyn E. Fields
Assistant Examiner—Drew A. Dunn
(74) Attorney, Agent, or Firm—Leonard A. Alkov; Karl A. Vick

(57) ABSTRACT

A method of marking and identifying an object (10) by the marking consists of applying to an object (10) an up-conversion material (12), then irradiating the object (10) with infrared electromagnetic radiation (16) and, finally, observing the irradiated object to detect the spectrum of emitted electromagnetic radiation (18). A suitable up-conversion material (12) is selected from a group of up-conversion materials consisting of $CaF_2$, $BaF_2$, $CdF_2$, $LaF_2$ and $SrF_2$ doped with erbium, praseodymium, neodymium or dysprosium. The objects (10) may be observed to detect emitted electromagnetic radiation (18) from that part of the electromagnetic spectrum that is visible to the naked eye. The objects (10) may also be observed to detect specific wavelengths of electromagnetic radiation which are known to be emitted by the up-conversion material (12) when the up-conversion material (12) is irradiated by designated wavelengths of infrared electromagnetic radiation. The irradiating infrared radiation (16) may be encoded by modulation so that identification may be made by detection of the encoded modulation in the radiation emitted (18) from the up-conversion material (12).

11 Claims, 1 Drawing Sheet

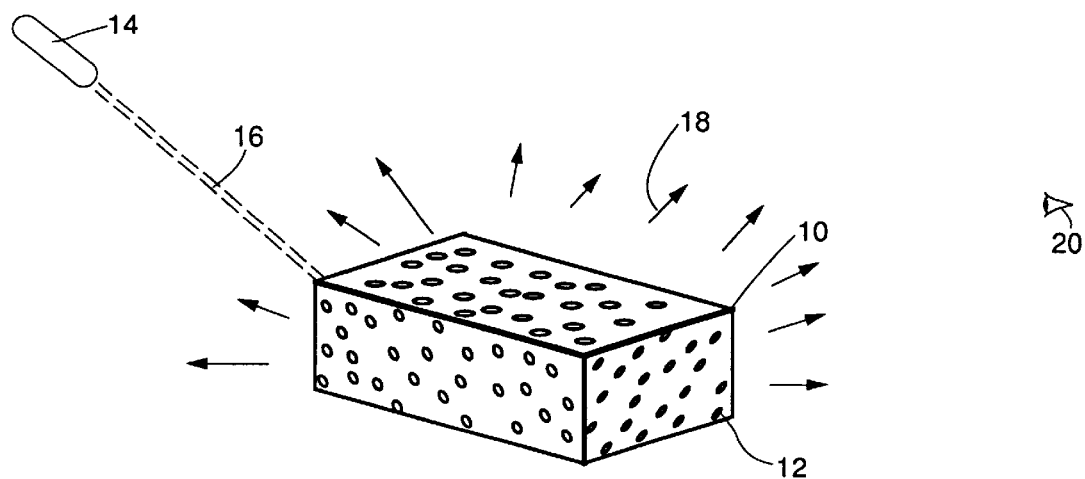
FIG. 1.
FIG. 2.
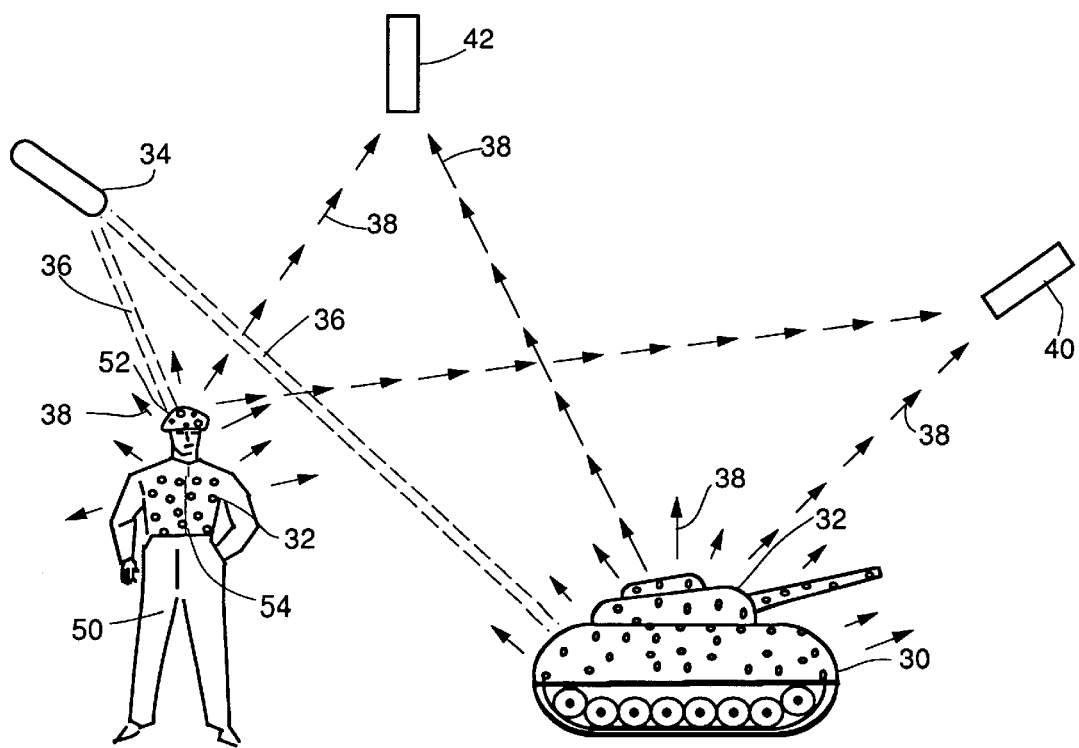

METHOD FOR MARKING AND IDENTIFYING OBJECTS COATED WITH UP-CONVERSION MATERIAL

This is a continuation of application Ser. No. 07/773,473, filed Oct. 9, 1991, now abandoned.

TECHNICAL FIELD OF THE INVENTION

The present invention relates to methods for marking and identifying objects, and more particularly to a method for marking objects and utilizing electromagnetic radiation to identify the objects that have been marked.

BACKGROUND OF THE INVENTION

In general, the purpose of marking an object and identifying the object by a marking is to enable an observer to determine his or her affiliation with the object. Objects are marked and identified in many contexts. In the context of fighting between groups, it is important that each group (the observer) be able to distinguish its forces (the objects) from the forces of another group or groups. Identification of one's own forces is particularly important in averting battlefield fratricide. Present methods of marking and identifying forces are problematic.

A problem in identifying forces is that it is necessary to make the identification from as great a distance as possible, without having to come into close contact with unknown forces. Reliable identification based upon normal human vision or magnified vision such as binoculars requires a proximity to objects that may be undesirable. Long-range identification is essential to effectively use long-range weaponry. In battlefield situations, it is also necessary that identification be accomplished as quickly as possible. However, rapid reliable identification is a problem generally, and is an even greater problem in long-range identification. Identification of forces is more difficult under conditions of low or no lighting and periods of unfavorable environmental conditions such as dust that can obscure markings. An additional problem is that if a group identifies its forces by markings which the group places upon the forces, marking must be done in a manner that cannot be easily simulated or abrogated by the enemy.

Certain substances emit definitive spectra of electromagnetic radiation when they are irradiated with infrared electromagnetic radiation. In these substances, emitted radiation is of a wavelength which is shorter than the wavelength of the irradiating radiation. This property can be referred to as "up-conversion," or "up-converting" of the radiation. Examples of up-conversion materials are compounds such as $CaF_2$, $BaF_2$, $CdF_2$, $LaF_2$ or $SrF_2$ doped with the rare-earth element erbium. It can be appreciated that it would be useful to have a method for marking and identifying objects that utilizes the up-conversion property of materials such as erbium-doped $CaF_2$, $BaF_2$, $CdF_2$, $LaF_3$, or $SrF_2$.

SUMMARY OF THE INVENTION

It is an object of the invention to provide a means for marking and identifying objects.

It is a further object of the invention to provide a means for marking and identifying an object such that the object can be reliably identified at great distances.

It is also an object of the invention to provide a means for marking and identifying an object in such a manner that markings placed upon the object cannot easily be simulated or abrogated.

In the present invention, a material which emits a distinctive electromagnetic radiation spectrum when irradiated by particular wavelengths of infrared electromagnetic radiation is applied to objects. Materials having this property are $CaF_2$, $BaF_2$, $CdF_2$, $LaF_3$ or $SrF_2$ doped with erbium, praseodymium, neodymium or dysprosium. The objects are observed after irradiation to detect emitted electromagnetic radiation. The objects may be observed to detect emitted electromagnetic radiation from that part of the electromagnetic spectrum that is visible to the naked eye. The objects may also be observed to detect specific wavelengths of electromagnetic radiation which are known to be emitted by the material when the material is irradiated by designated wavelengths of infrared electromagnetic radiation. The irradiating infrared radiation may be encoded by modulation so that identification may be made by detection of the encoded modulation in the radiation emitted from the material.

Other aspects, objects, features, and advantages of the present invention will become apparent to those skilled in the art upon reading the detailed description of preferred embodiments.

BRIEF DESCRIPTION OF THE DRAWINGS

FIG. 1 is a schematic illustration of a method for identifying objects embodying teachings of the present invention.

FIG. 2 is a schematic illustration of a system for identifying objects embodying additional teachings of the present invention.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of embodiments.

In a preferred embodiment of the invention an object is identified by applying to the object a substance which emits a distinct electromagnetic spectrum when irradiated. As a next step, the object is irradiated and observed to detect emitted radiation. The distinct spectrum emitted by the substance-laden object is a spectrum of electromagnetic radiation of shorter wavelengths than the wavelengths of irradiating radiation. The invention utilizes the propensity of particular materials to up-convert certain electromagnetic radiation to electromagnetic radiation of a shorter wavelength. A class of so-called up-conversion materials is used for this purpose. The most effective up-conversion materials employ a cooperative excitation mechanism. Under the excitation mechanism, when materials are exposed to certain infrared radiation the ground-state electrons of some atoms, absorbing one electron each, are excited to an intermediate metastable excited state. Some energy subsequently migrates through a non-radiative process to a single atom and excites the atom to a higher excited state. From this last higher excited state fluorescence occurs, with wavelengths shorter than the original infrared radiation.

Erbium, when doped into a certain host material, is an element that is able to up-convert electromagnetic radiation. Triply-ionized rare earth erbium atoms ($Er^{3+}$), contained as impurities in various host lattices, utilize cooperative excitation to very efficiently up-convert infrared radiation having wavelengths of about 0.9 micrometer and about 1.5 micrometer to shorter wavelengths. In particular, the up-converted spectrum of $CaF_2(Er^{3+})$ excited by laser radiation having a wavelength of 1.54 micrometer consists of several 20–50 nanometer-wide bands extending between wavelengths of 0.38 micrometer and 2.7 micrometer. The strongest bands, listed in order of decreasing intensity, peak at approximately 0.98, 0.67, 0.805, and 0.55 micrometer.

Preferred embodiments of the invention use the up-conversion property of suitable materials in several ways to identify objects. All embodiments provide for irradiation of the object to stimulate the up-conversion material. A suitable means of irradiation is a continuous-wave infrared laser. In accordance with one embodiment, the up-converted, emitted radiation is observed to detect electromagnetic radiation from that portion of the spectrum which is visible to the naked eye.

In accordance with another embodiment, the up-converted radiation is observed to detect specific wavelengths which are known to be emitted from the irradiated material when stimulated by electromagnetic energy of the wavelength of the irradiating radiation. Under this embodiment, the emitted radiation is monitored at the known peaks of emitted radiation. For example, in an instance of irradiating $CaF_2(Er^{3+})$ by 1.54 micrometer laser radiation as described above, the peak intensities of 0.98, 0.67, 0.805, and 0.55 micrometer would be monitored. Although the emitted radiation may be observed for detection of the entire distinctive spectrum of emitted radiation, detection of particular wavelengths may be easier and quicker. Isolation of particular wavelengths for detection can be accomplished through the use of filters which allow only selected wavelengths to pass. The relative radiation intensity at the peak wavelengths is different from that produced by background blackbody radiation of the irradiated object. Blackbody radiation in this sense is non-up-converted radiation emitted by an object due to its temperature. Thus, the up-converted radiation can be distinguished from non-up-converted radiation of the same wavelength because of the difference in relative radiation intensity.

According to a further embodiment of the invention, the irradiating radiation is encoded by certain modulation. The up-converted radiation will carry the encoding. The up-converted radiation is monitored at one of the peak wavelengths to detect the modulation in that wavelength of radiation. The detected modulation is compared to the encoding modulation for identification. Encoding may be accomplished through amplitude or pulse parameters.

Any material which distinctively up-converts electromagnetic radiation may be used to practice the invention. The example of erbium-doped $CaF_2$ has been noted above. Other rare earth elements exhibit the same up-converting properties when doped into $CaF_2$ or other suitable host compounds. Examples of other suitable rare earth substances are praseodymium, neodymium and dysprosium. Other host compounds may also be used. Examples of other suitable host substances are $BaF_2$, $CdF_2$, $LaF_3$, and $SrF_2$. Each doped compound exhibits a different spectrum of wavelengths upon irradiation.

Several methods may be used to apply the up-conversion material to the objects to be identified. In general, any method that will allow the material to lie upon the object and receive and emit electromagnetic radiation is suitable. For example, the material may be ground into fine powder and mixed into paints for items such as buildings, vehicles and apparel. Or, ground powder may be combined with laundry detergent so that the material attaches to apparel washed in the detergent-material mixture. Or, a ground powder of the mixture may be mixed with an aerosol dispersant and applied by aerosol spray.

As previously stated, an irradiated coated object may be observed simply by viewing with the naked eye or magnified vision to detect those wavelengths of emitted radiation visible to the naked eye or through magnified vision. A more sophisticated means of detecting visible and non-visible emitted radiation from troops or other objects on a battlefield is to use a telescope-type of optical system to collect and focus the energy to a detector, with appropriate narrow band filters.

The infrared portion of the electromagnetic spectrum pertinent to this invention extends from wavelengths of about $0.7 \times 10^{-6}$ M to about $3 \times 10^{-6}$ M. Certain wavelengths of infrared radiation will up-convert to a distinct spectrum of wavelengths for each up-conversion material selected. Thus, there are many possible combinations of irradiating wavelengths and up-conversion material. This allows for many variations of identification spectra. The spectrum of up-converted radiation may include wavelengths of radiation that lie within the visible-light portion of the electromagnetic spectrum. A large selection of distinct identification spectra makes it very difficult for enemy forces to correctly simulate a group's markings. The two parameters which govern the operation of the invention, namely, the type of up-conversion material used and the wavelength of irradiating infrared radiation used, give the user great flexibility in marking and identifying objects.

An additional advantage of the invention is that the up-conversion material can be applied to many types of surfaces but without noticeably increasing the weight or volume of the object and without inconveniencing the user of the object.

Another advantage is that the invention is not dependent upon lighting which is necessary for unaided or magnified visual identification. Dusty conditions, as are frequently prevalent in battlegrounds, will not inhibit observation and detection of the electromagnetic frequencies involved.

Identification of the emitted radiation is reliable because the emission spectra are distinct and predictable. The emission spectra are verified prior to field use of a particular up-conversion material and wavelength of irradiating radiation. The invention permits identification to be made quickly because the emitted radiation can be observed-immediately upon irradiation of the object coated with up-conversion material.

The invention has been described as it relates to the marking and identification of combat forces in particular, however, the invention is useful for marking and identifying any object to which the up-conversion materials may be applied and which may be irradiated by infrared electromagnetic radiation and then observed.

Reference will now be made to the drawings which illustrate the features of the invention described above. Referring first to FIG. 1, therein is illustrated a simple embodiment of the invention in which an up-conversion material 12 has been applied to an object 10. Identification of the object 10 is achieved by irradiating the object 10 with infrared electromagnetic radiation 16 from an infrared irradiating source 14. A suitable infrared irradiating source 14 is an infrared laser which propagates an infrared laser beam as the irradiating infrared electromagnetic radiation. In the simple embodiment illustrated, the irradiated object 10 is observed by an observer 20 to detect emitted radiation 18 that would be visible to the naked eye of the observer 20. As stated above, some of the up-converted radiation may lie within the visible-light portion of the electromagnetic spectrum.

Referring now to FIG. 2, therein is illustrated a system for identifying an object. FIG. 2 illustrates the main components of the system, namely, an object to be identified upon which is disposed up-conversion material, an irradiating source and a detector. Two objects are illustrated, a tank 30 and a soldier 50. With respect to the soldier 50, the more specific objects to be identified are the soldier's 50 helmet 52 and clothing 54 worn by the soldier 50. Up-conversion material 32 is disposed upon the tank 30, the helmet 52 and clothing 54. The up-conversion material 32 may be applied to the objects 30, 52 and 54 by mixing the up-conversion material 32 with paint which is then applied to the objects 30, 52 and 54. The up-conversion material 32 may be mixed with an aerosol carrier substance and disposed upon the objects 30, 52 and 54 by spraying them with the aerosol mixture. In order to apply the up-conversion material 32 to clothing 54, the up-conversion material 32 may be mixed with a detergent which is used to wash the clothing 54. Upon washing, the up-conversion material 32 is deposited upon the clothing 54. Each object 30, 52 and 54 is irradiated by infrared electromagnetic radiation (laser beam) 36 from an infrared irradiating source (infrared laser) 34. The irradiating source 34 is positioned in any manner that facilitates irradiation of the objects 30, 52 and 54. The irradiating source 34 may be hand-held, mounted upon a tower, mounted upon a vehicle, mounted upon an airplane or placed in space upon a satellite or other space-born carrier. As a practical matter, a large area which contains objects 30, 52 and 54 to be irradiated can be serviced by placement of the irradiating source 34 at a high elevation relative to the objects 30, 52 and 54. The irradiated, coated tank 30, helmet 52 or clothing 54 emits electromagnetic radiation 38. A detector 40 is used to detect emitted radiation 38. The detector 40 may be as simple as a light meter which has a filter placed over its aperture that allows only pre-selected wavelengths of light to pass. The detector 40 may be a light-metering or light-sensing device coupled with a filter and telescoping mechanism such as is used in infrared scopes for rifles and similar weapons. The detector 40 receives emitted radiation 38 from the irradiated objects 30, 52 and 54 and provides a read-out which is perceivable to an observer which tells the observer that pre-determined wavelengths of electromagnetic radiation are present in the emitted radiation 38. The pre-determined wavelengths of radiation will be of a greater intensity than would normally be present due to irradiation of the up-conversion material 32. The detector's 34 response to the high intensity of pre-determined wavelengths identifies the irradiated object 30, 52 and 54 as containing the up-conversion material 32. A detector 40 or 42 may be placed in several locations. The detector 40 may be placed at a location distinct and remote from the irradiating source 34. Or the detector 42 may be placed in close proximity to the irradiating source 34. When the detector 42 is placed in close proximity to the irradiating source 34 an observer may activate the irradiating source 34 and then quickly read the response of the irradiated object 30, 52 or 54 from the detector 42. A large area which contains objects 30, 52 and 54 to be identified can be serviced by placement of the detector 40 or 42 at a high elevation relative to the objects 30, 52 and 54. As with the irradiating source, the detector 40 or 42 may be hand-held, mounted upon a tower, mounted upon a vehicle or airborne.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A method for marking and identifying an object which cannot be easily simulated, comprising:

coating the object with up-conversion material;

irradiating said up-conversion material coated object with infrared electromagnetic radiation of one of a plurality of predetermined wavelengths which has been encoded with a certain modulation so that said up-conversion material emits a spectrum of encoded electromagnetic radiation having wavelengths shorter than wavelengths of said infrared electromagnetic radiation and having a predetermined unique spectral distribution; and observing the object after said irradiating to detect said radiation at said wavelengths which constitute said unique spectral distribution and contain, said modulation in said electromagnetic radiation emitted by said up-conversion material, whereby the object is identified.

2. The method of claim 1 wherein said up-conversion material is selected from the group consisting of erbium-doped $CaF_2$, $BaF_2$, $CdF_2$, $LaF_3$ and $SrF_2$.

3. The method of claim 1 wherein said up-conversion material is selected from the group consisting of praseodymium-doped $CaF_2$, $BaF_2$, $CdF_2$, $LaF_3$ and $SrF_2$.

4. The method of claim 1 wherein said up-conversion material is selected from the group consisting of neodymium-doped $CaF_2$, $BaF_2$, $CdF_2$, $LaF_3$ and $SrF_2$.

5. The method of claim 1 wherein said up-conversion material is selected from the group consisting of dysprosium-doped $CaF_2$, $BaF_2$, $CdF_2$, $LaF_3$ and $SrF_2$.

6. The method of claim 1 wherein said encoding comprises amplitude modulation.

7. The method of claim 1 wherein said encoding comprises pulse modulation.

8. The method of claim 1 wherein said encoding comprises a mixture of a plurality of different wavelengths.

9. A method for marking and identifying an object which cannot be easily simulated, comprising:

applying to the object an up-conversion material selected from the group of up-conversion materials consisting of $CaF_2$, $BaF_2$, $CdF_2$, $LaF_3$ and $SrF_2$ doped with an element from the group of rare-earth elements consisting of erbium, praseodymium, neodymium and dysprosium;

irradiating said up-conversion material on said object with infrared electromagnetic radiation of designated wavelengths which have been encoded with a modulation so that said up-conversion material emits a spectrum of encoded electromagnetic radiation having wavelengths shorter than wavelengths of said infrared electromagnetic radiation of designated wavelengths and having a predetermined spectral distribution; and, observing said spectrum of electromagnetic radiation emitted by said up-conversion material on said object to identify the modulated electromagnetic radiation having said predetermined spectral distribution, whereby the object is identified.

10. The method of claim 9 wherein said encoding comprises amplitude modulation.

11. The method of claim 9 wherein said encoding comprises pulse modulation.

* * * * *